US012687128B2

(12) United States Patent
Mook et al.

(10) Patent No.: US 12,687,128 B2
(45) Date of Patent: Jul. 21, 2026

(54) MONOLITHIC SUPERSTRUCTURE FOR GAS TURBINE ENGINES

(71) Applicant: General Electric Company, Schenectady, NY (US)

(72) Inventors: Joshua Tyler Mook, Cincinnati, OH (US); John Alan Manteiga, Lynn, MA (US); Christopher Williams, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/649,607

(22) Filed: Apr. 29, 2024

(65) Prior Publication Data

US 2024/0280052 A1      Aug. 22, 2024

Related U.S. Application Data

(63) Continuation of application No. 17/526,340, filed on Nov. 15, 2021, now Pat. No. 12,000,339, which is a
(Continued)

(51) Int. Cl.
*F02C 3/14* (2006.01)
*F01D 25/16* (2006.01)
(Continued)

(52) U.S. Cl.
CPC .............. *F02C 7/06* (2013.01); *F01D 25/162* (2013.01); *F01D 25/246* (2013.01); *F02C 3/14* (2013.01);
(Continued)

(58) Field of Classification Search
CPC ................. F02C 3/14; F02C 7/06; F02C 3/09
See application file for complete search history.

(56) References Cited

U.S. PATENT DOCUMENTS

| | | | |
|---|---|---|---|
| 3,319,930 A | 5/1967 | Howald | |
| 4,653,976 A | 3/1987 | Blair et al. | |

(Continued)

FOREIGN PATENT DOCUMENTS

| | | | |
|---|---|---|---|
| CN | 1900508 A | 1/2007 | |
| CN | 103097669 A | 5/2013 | |

(Continued)

OTHER PUBLICATIONS

International Searching Authority, "Written Opinion," issued May 4, 2018 in connection with International Patent Application No. PCT/US2017/055847, 13 pages.
(Continued)

*Primary Examiner* — Phutthiwat Wongwian
*Assistant Examiner* — Jacek Lisowski
(74) *Attorney, Agent, or Firm* — Hanley, Flight and Zimmerman, LLC

(57) ABSTRACT

The present disclosure generally relates to monolithic super-structures for supporting a rotating shaft coupled to a rotor relative to a stator. An integral superstructure supports the rotating component. The superstructure includes a bearing portion that contacts the shaft. A stator portion, is spaced a critical dimension radially outward, from the rotor. A first annular transfer portion extends axially forward from the bearing to the stator portion. A second annular transfer portion extends axially aft from the stator portion to a mounting flange. The mounting flange connects the super-structure to a frame. The superstructure maintains a critical dimension between the rotor and the stator as the tempera-ture of the superstructure increases. The rotor may be a compressor impeller in a gas turbine engine and the stator may be an aero component that transfers air into a combus-tor.

18 Claims, 10 Drawing Sheets

Related U.S. Application Data continuation of application No. 15/352,253, filed on Nov. 15, 2016, now Pat. No. 11,174,786.

(51) Int. Cl.

| | |
|---|---|
| *F01D 25/24* | (2006.01) |
| *F02C 7/06* | (2006.01) |
| *F02C 7/18* | (2006.01) |
| *F02C 7/20* | (2006.01) |
| *F04D 29/053* | (2006.01) |
| *F04D 29/056* | (2006.01) |
| *F04D 29/32* | (2006.01) |
| *F04D 29/54* | (2006.01) |

(52) U.S. Cl.

CPC .................. *F02C 7/18* (2013.01); *F02C 7/20* (2013.01); *F04D 29/053* (2013.01); *F04D 29/056* (2013.01); *F04D 29/321* (2013.01); *F04D 29/541* (2013.01); *F05D 2220/32* (2013.01); *F05D 2240/35* (2013.01)

(56) References Cited

U.S. PATENT DOCUMENTS

| | | | | |
|---|---|---|---|---|
| 4,854,126 | A | * | 8/1989 | Chevis .................... F01D 9/045 |
| | | | | 417/409 |
| 5,555,721 | A | | 9/1996 | Bourneuf et al. |
| 6,578,351 | B1 | | 6/2003 | Modafferi |
| 7,777,155 | B2 | | 8/2010 | Twelves, Jr. et al. |
| 8,469,309 | B2 | | 6/2013 | Stuart et al. |
| 8,506,836 | B2 | | 8/2013 | Szuromi et al. |
| 8,668,442 | B2 | | 3/2014 | Morris et al. |
| 9,915,173 | B2 | | 3/2018 | Perronnet et al. |
| 11,174,786 | B2 | | 11/2021 | Mook et al. |
| 12,000,339 | B2 | | 6/2024 | Mook et al. |
| 2003/0077166 | A1 | | 4/2003 | Czachor et al. |
| 2005/0061005 | A1 | | 3/2005 | Lepretre et al. |
| 2005/0102994 | A1 | | 5/2005 | Lepretre et al. |
| 2005/0169749 | A1 | | 8/2005 | Coulon et al. |
| 2005/0232762 | A1 | | 10/2005 | Smoke et al. |
| 2005/0235651 | A1 | | 10/2005 | Morris et al. |
| 2006/0272314 | A1 | | 12/2006 | Moniz et al. |
| 2007/0036646 | A1 | | 2/2007 | Nguyen et al. |
| 2008/0141680 | A1 | | 6/2008 | Brunet et al. |
| 2010/0154433 | A1 | | 6/2010 | Ottaviano et al. |
| 2010/0158668 | A1 | * | 6/2010 | Ottaviano ................. F02C 7/18 |
| | | | | 415/177 |
| 2011/0206502 | A1 | | 8/2011 | Rulli et al. |
| 2013/0323473 | A1 | | 12/2013 | Dietsch et al. |
| 2014/0182292 | A1 | | 7/2014 | Hudon et al. |
| 2014/0255181 | A1 | * | 9/2014 | Ress, Jr. .............. F04D 29/083 |
| | | | | 415/230 |
| 2015/0052872 | A1 | | 2/2015 | Zurmehly et al. |
| 2015/0107256 | A1 | * | 4/2015 | Prociw .................... F23R 3/283 |
| | | | | 60/739 |
| 2015/0337681 | A1 | | 11/2015 | Scott et al. |
| 2016/0186601 | A1 | * | 6/2016 | Manning ............... F04D 29/441 |
| | | | | 415/121.2 |
| 2016/0265388 | A1 | | 9/2016 | Annati et al. |
| 2016/0281534 | A1 | | 9/2016 | Noel et al. |
| 2016/0297097 | A1 | | 10/2016 | Riman |
| 2017/0009603 | A1 | | 1/2017 | Carter et al. |
| 2017/0226927 | A1 | | 8/2017 | Ganiger et al. |
| 2017/0362947 | A1 | * | 12/2017 | Nasir ........................ F02C 3/04 |

FOREIGN PATENT DOCUMENTS

| | | | |
|---|---|---|---|
| CN | 104053865 | A | 9/2014 |
| CN | 105814287 | A | 7/2016 |
| CN | 205477776 | U | 8/2016 |
| EP | 1517006 | A1 | 3/2005 |
| EP | 2539546 | A1 | 1/2013 |
| EP | 3115551 | A1 | 1/2017 |
| EP | 3203037 | A1 | 8/2017 |
| JP | 2008025579 | A | 2/2008 |
| JP | 2010151133 | A | 7/2010 |
| JP | 2010151134 | A | 7/2010 |
| JP | 2017053342 | A | 3/2017 |
| JP | 2017141818 | A | 8/2017 |
| WO | 2013101873 | A1 | 7/2013 |
| WO | 2014105577 | A1 | 7/2014 |
| WO | 2015069849 | A1 | 5/2015 |
| WO | 2018093479 | A1 | 5/2018 |

OTHER PUBLICATIONS

International Searching Authority, "International Search Report," issued May 4, 2018 in connection with International Patent Application No. PCT/US2017/055847, 7 pages.

United States Patent and Trademark Office, "Restriction Requirement," issued Feb. 5, 2019 in connection with U.S. Appl. No. 15/352,253, 10 pages.

International Searching Authority, "International Preliminary Report on Patentability," issued May 21, 2019 in connection with International Patent Application No. PCT/US2017/055847, 14 pages.

United States Patent and Trademark Office, "Non-Final Office Action," issued Sep. 13, 2019 in connection with U.S. Appl. No. 15/352,253, 23 pages.

United States Patent and Trademark Office, "Final Office Action," issued Mar. 4, 2020 in connection with U.S. Appl. No. 15/352,253, 25 pages.

Canadian Intellectual Property, "Office Action," issued Apr. 9, 2020 in connection with Canadian Patent Application No. 3,042,869, 4 pages.

Japan Patent Office, "Search Report by Registered Search Organization," issued in connection with Japanese Patent Application No. 2019525796, dated May 26, 2020, 42 pages. [English translation included].

European Patent Office, "Intention to Grant," issued Jun. 17, 2020 in connection with European Patent Application No. 17791788.7, 7 pages.

United States Patent and Trademark Office, "Advisory Action," issued Jun. 19, 2020 in connection with U.S. Appl. No. 15/352,253, 3 pages.

Japanese Patent Office, "Office Action," issued Jun. 22, 2020 in connection with Japanese Patent Application No. 2019-525796, 10 pages (including translation).

United States Patent and Trademark Office, "Non-Final Office Action," issued Jul. 31, 2020 in connection with U.S. Appl. No. 15/352,253, 25 pages.

Japanese Patent Office, "Written Opinion," issued in connection with Japanese Patent Application No. 2019-525796, dated Oct. 2, 2020, 11 pages. [English Translation Included].

European Patent Office, "Decision to Grant," issued Oct. 29, 2020 in connection with European Patent Application No. 17791788.7, 2 pages.

Canadian Intellectual Property, "Notice of Allowance," issued Nov. 30, 2020 in connection with Canadian Patent Application No. 3,042,869, 1 page.

United States Patent and Trademark Office, "Final Office Action," issued Dec. 11, 2020 in connection with U.S. Appl. No. 15/352,253, 19 pages.

European Patent Office, "Extended European Search Report," issued Feb. 8, 2021 in connection with European Patent Application No. 20200997.3, 13 pages.

Japanese Patent Office, "Notice of Reasons for Refusal," issued in connection with Japanese Patent Application No. 2019-525796, dated Mar. 15, 2021, 6 pages. [English Translation Included].

United States Patent and Trademark Office, "Non-Final Office Action," issued Mar. 29, 2021 in connection with U.S. Appl. No. 15/352,253, 20 pages.

Japanese Patent Office, "Written Opinion," issued in connection with Japanese Patent Application No. 2019-525796, dated Apr. 15, 2021, 2 pages. [English Translation Included].

(56)     References Cited

OTHER PUBLICATIONS

China National Intellectual Property Administration, "Office Action," issued Apr. 26, 2021 in connection with Chinese Patent Application No. 201780081798.9, 11 pages (including partial translation).

Chinese National Intellectual Property Administration, "Supplementary Search," issued May 19, 2022 in connection with Chinese Patent Application No. 201780081798.9, 1 page.

Japanese Patent Office, "Decision to Grant a Patent," issued in connection with Japanese Patent Application No. 2019-525796, dated May 31, 2021, 5 pages. [English Translation Included].

United States Patent and Trademark Office, "Notice of Allowance," issued Jul. 20, 2021 in connection with U.S. Appl. No. 15/352,253, 9 pages.

China National Intellectual Property Administration, "Office Action," issued Dec. 17, 2021 in connection with Chinese Patent Application No. 201780081798.9, 15 pages (including translation).

China National Intellectual Property Administration, "The Third Office Action," issued in connection with Chinese Patent Application No. 201780081798.9, dated May 30, 2022, 10 pages. [English machine translation included].

European Patent Office, "Communication Pursuant to Article 94(3) EPC," issued Sep. 15, 2022 in connection with European Patent Application No. 20200997.3, 5 pages.

United States Patent and Trademark Office, "Non-Final Office Action," issued in connection with U.S. Appl. No. 17/526,340, dated Nov. 1, 2022, 27 pages.

United States Patent and Trademark Office, "Final Office Action," issued in connection with U.S. Appl. No. 17/526,340, dated Apr. 25, 2023, 29 pages.

United States Patent and Trademark Office, "Advisory Action," issued in connection with U.S. Appl. No. 17/526,340, mailed on Jul. 19, 2023, 3 pages.

United States Patent and Trademark Office, "Non-Final Office Action," issued in connection with U.S. Appl. No. 17/526,340, mailed on Aug. 7, 2023, 28 pages.

European Patent Office, "Communication under Rule 71(3) EPC," issued in connection with European Patent Application No. 20 200 997.3-1004, mailed on Sep. 22, 2023, 32 Pages.

United States Patent and Trademark Office, "Notice of Allowance and Fee(s) Due," issued in connection with U.S. Appl. No. 17/526,340, dated Jan. 30, 2024, 7 pages.

European Patent Office, "Decision to grant a European patent pursuant to Article 97(1) EPC," issued in connection with European Patent Application No. 20 200 997.3-1004, dated Feb. 1, 2024, 2 pages.

United States Patent and Trademark Office, "Supplemental Notice of Allowability," issued in connection with U.S. Appl. No. 17/526,340, dated Feb. 20, 2024, 2 pages.

* cited by examiner

MONOLITHIC SUPERSTRUCTURE FOR GAS TURBINE ENGINES

RELATED APPLICATIONS

This patent arises from a continuation of U.S. patent application Ser. No. 17/526,340, filed on Nov. 15, 2021 and entitled "MONOLITHIC SUPERSTRUCTURE FOR LOAD PATH OPTIMIZATION," which is a continuation of U.S. patent application Ser. No. 15/352,253, filed on Nov. 15, 2016 and entitled "MONOLITHIC SUPERSTRUCTURE FOR LOAD PATH OPTIMIZATION," now U.S. Pat. No. 11,174,786. Priority to U.S. patent application Ser. No. 15/352,253 and U.S. patent application Ser. No. 17/526,340 is claimed. U.S. patent application Ser. No. 15/352,253 and U.S. patent application Ser. No. 17/526,340 are incorporated herein in their entirety.

INTRODUCTION

The present disclosure generally relates to monolithic superstructures for supporting a rotating shaft coupled to a rotor relative to a stator. In an example, the rotor is an impeller for a gas turbine engine and the stator is an aero component for directing compressed air from the impeller.

BACKGROUND

In a gas turbine engine, intake air is compressed by a compressor. Fuel is added to the compressed air and ignited in a combustor. The expanding hot air passes through a turbine and out of a nozzle providing thrust. The turbine converts some of the energy of the expanding hot air into rotational energy for powering the compressor.

An interface between the compressor and combustor includes critical spacing between the rotating impeller and a stationary aero component. In an aspect, the rotating impeller is a final centripetal compressor impeller that produces highly compressed air. The stationary aero component directs the compressed air into the combustor while diffusing the pressure and reducing swirling currents within the compressed air. The alignment and clearance between the impeller and the aero component is a critical dimension that affects the performance of the gas turbine engine. If the components become misaligned or the clearance becomes too great, the compressed air does not correctly enter the combustor.

In conventional gas turbine engines, an impeller shroud is mounted to a combustor case (e.g., via bolts or rivets). The aero component is supported at the connection between the impeller shroud and combustor case. As temperatures of the engine increase, thermal expansion causes the aero component to move with respect to the impeller. Accordingly, the alignment and clearance between the aero component and the impeller changes, leading to decreased performance of the engine.

FIG. 1 is schematic diagram showing a cross-sectional view of an exemplary conventional system 100 including an interface 102 between a compressor 110 and combustor 120. A compressor case 112 is coupled with an impeller shroud 116. An impeller 114 rotates along with the shaft 126. The impeller shroud 116 is coupled to a combustor case 122 via a connector 118. The shaft 128 is rotatably supported by bearings 128. The bearings 128 transfer load from the shaft 126 to a sump housing 134. The sump housing 134 is coupled to the aero component 130, which in turn is mounted to the combustor case 122 at the connection between the connector 118 and the combustor case 122. The combustor case 122 includes a mounting point 124 for mounting the system 100 to a vehicle or other frame (e.g. a generator housing).

A load path 136 illustrates the distribution of load from the shaft 126 in the conventional system 100. The load is applied to the bearings 128 and transferred to the sump housing 134. The sump housing 134 transfers load to the aero component 130, which in turn transfers load to both the compressor 110 via the connector 118 and to the combustor 120 including the mounting point 124.

The inset portion 150 illustrates relative movement of the impeller 116 and the aero component 130 as the temperature of the system 100 changes. As indicated by the solid lines, when the system is relatively cold, the impeller 116 and the aero component 130 are aligned with a small clearance therebetween. The clearance may be, for example, approximately 20 mils. As illustrated by the dashed lines, when the system is relatively hot, thermal expansion causes the hot aero component to shift radially outward and longitudinally distal. These directions are due, in part, to the aero component 130 exerting load to the compressor 110 via the connector 118, which adds a longitudinal component to the expansion. The hot impeller 152 shifts radially outward. The clearance between the impeller 116 and the aero component 150 increases and the components become misaligned.

In view of the above, it can be appreciated that there are problems, shortcomings or disadvantages associated with supporting a rotor such as an impeller with respect to a stator such as an aero component in gas turbine engines, and that it would be desirable if improved systems and methods for supporting a rotor with respect to a stator were devised.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides an apparatus for transferring load from a rotating component including a longitudinal shaft and a rotor. The apparatus includes an integral superstructure supporting the rotating component. The integral superstructure includes a bearing portion that contacts the shaft. The integral superstructure includes a stator portion, spaced a critical dimension radially outward, from the rotor. The integral superstructure includes a first annular transfer portion extending axially forward from the bearing to the stator portion. The integral superstructure includes a mounting flange that connects the superstructure to a frame. The integral superstructure includes a second annular transfer portion extending axially aft from the stator portion to the mounting flange.

In another aspect, the disclosure provides a method of distributing bearing load. The method includes transferring a load from a rotating shaft to a bearing portion of a superstructure via contact between the shaft and the bearing portion. The method includes transferring the load from the bearing portion via a first annular support of the superstructure to a stator portion. The method includes transferring the load from the stator portion of the super structure to a second annular support. The method includes transferring the load from the second annular support to a mounting tab. The method includes transferring the load from the mounting tab to a vehicle.

In another aspect, the disclosure provides a component of a gas turbine engine comprising. The component includes a monolithic superstructure including an outer case including a longitudinally proximal diffuser case portion, at least one mounting flange, and a longitudinally distal combustor case portion. The monolithic superstructure also includes an aero component connected to the outer case via an annular aero portion support, the aero component including a diffuser portion and a deswirler portion comprising a plurality of conjoined tubes extending from a radial end of the diffuser portion to an interior of the combustor case portion.

In yet another aspect, the disclosure provides a method of supporting loads in a gas turbine engine. The method includes transferring a load from a rotating shaft to a bearing portion of a sump housing via contact between the shaft and the bearing portion. The method includes transferring the load from the bearing portion via a conical member of the sump housing to an aero component including a diffuser portion and a deswirler portion comprising a plurality of conjoined tubes extending from a radially distal end of the diffuser portion to an interior of a combustor case. The method includes transferring the load from the aero component to an annular aero component support connected to the plurality of conjoined tubes. The method includes transferring the load from the annular aero component support to a mounting tab. The method includes transferring the load from the mounting tab to a frame supporting the gas turbine engine.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear or outlet of the engine, or a component being relatively closer to the outlet than the inlet.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

Figure 2:
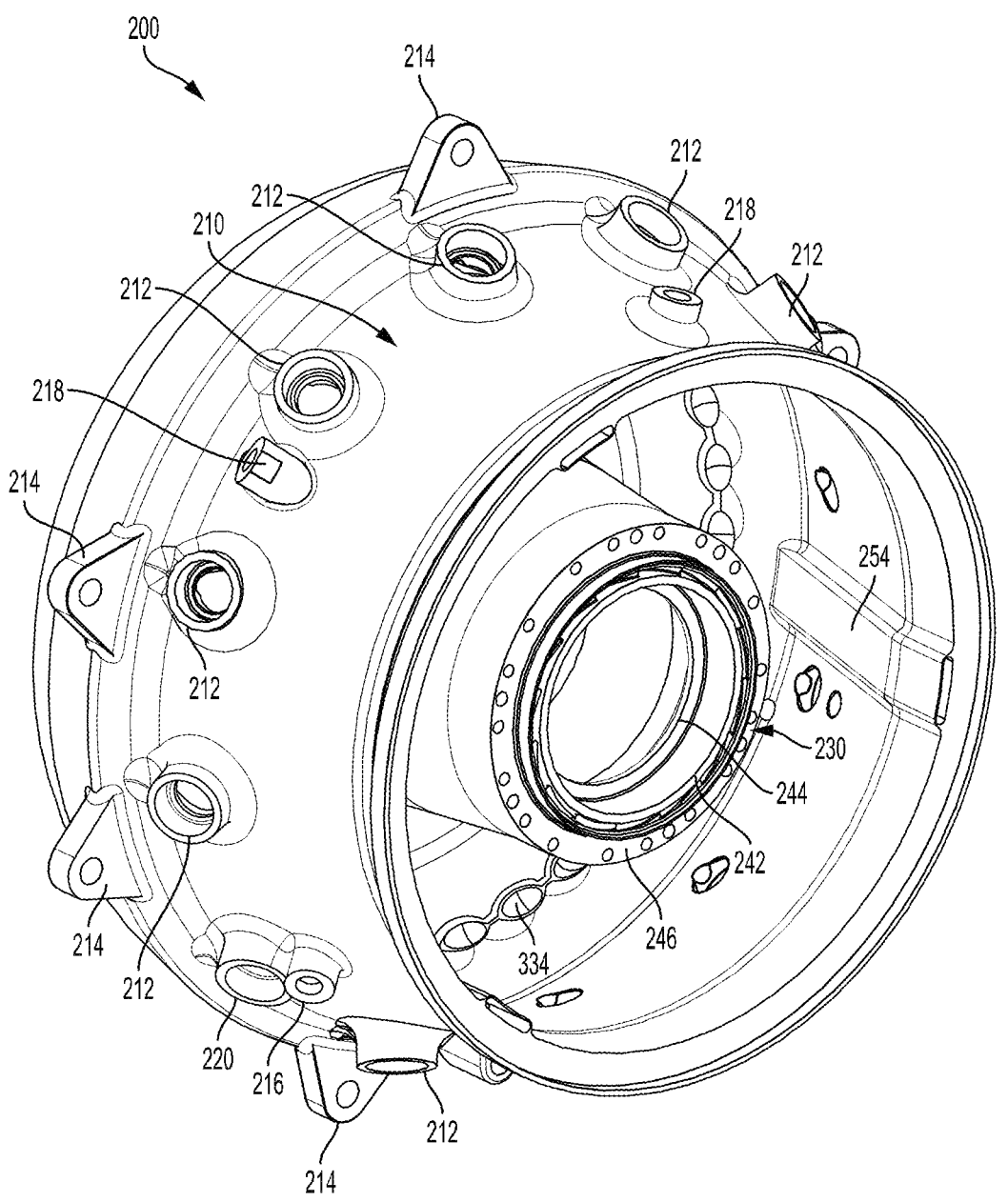
FIG. 2 illustrates a perspective view of an exemplary superstructure according to an aspect of the disclosure.

FIGS. 2-9 illustrate an exemplary monolithic superstructure 200 according to an aspect of the disclosure. FIG. 2 illustrates a perspective view of the monolithic superstructure 200. The monolithic superstructure 200 may be a superstructure for a combustor in a gas turbine engine. In an aspect, the monolithic superstructure 200 is be a single integrated component that performs functions of multiple components in conventional combustors. For example, the monolithic superstructure 200 perform functions of an aero component, which typically includes a separate diffuser, deswirler, swirl plate, and diffuser case. The monolithic superstructure 200 also performs the functions of a combustor case assembly (e.g., routing fuel, air, and instrumentation to various components of the combustor). The monolithic superstructure 200 also performs the functions of a bearing sump of supporting the shaft and managing turbine cooling air using an inner shroud. As discussed in further detail below, by combining the various functions of combustor components into an integrated component, the monolithic superstructure 200 reduces the total weight of the combustor. The monolithic superstructure 200 also allows for design of optimized paths, thereby requiring lower oil volumes and transport lengths. Further, the monolithic superstructure eliminates assembly risks and fastener failures.

Figure 3:
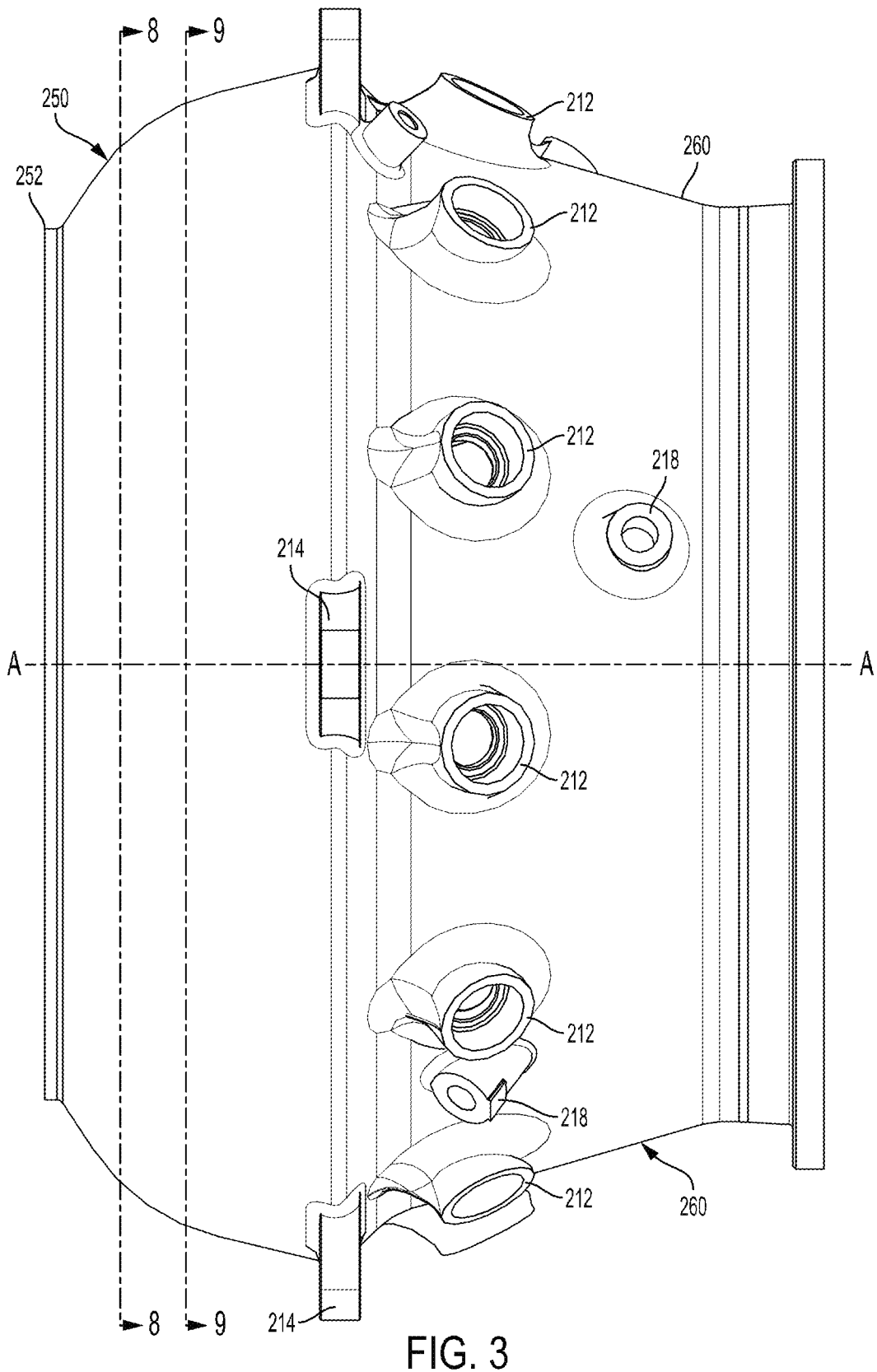
FIG. 3 illustrates a top view of the exemplary superstructure of FIG. 2.
Figure 4:
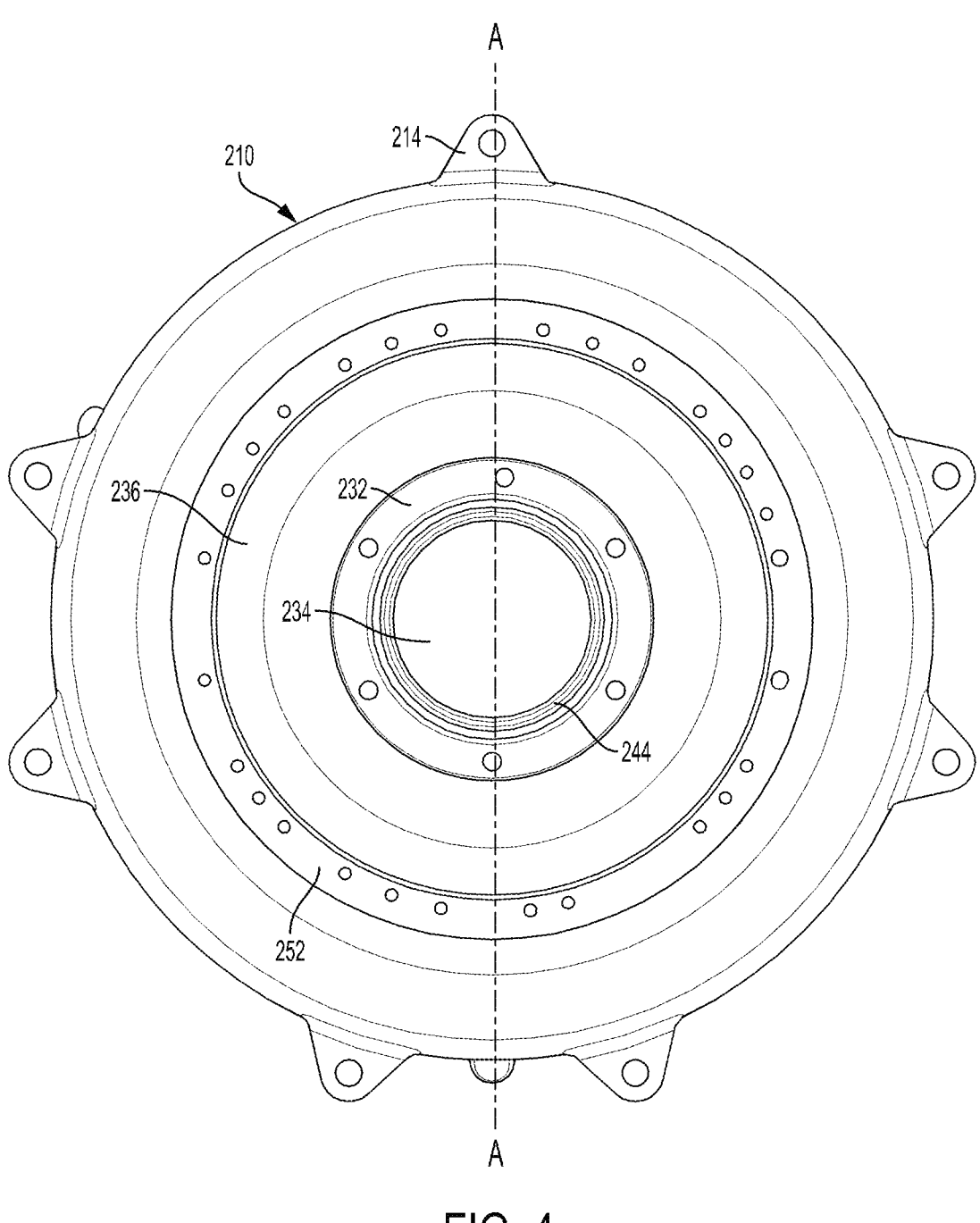
FIG. 4 illustrates a forward view of the exemplary superstructure of FIG. 2.
Figure 5:
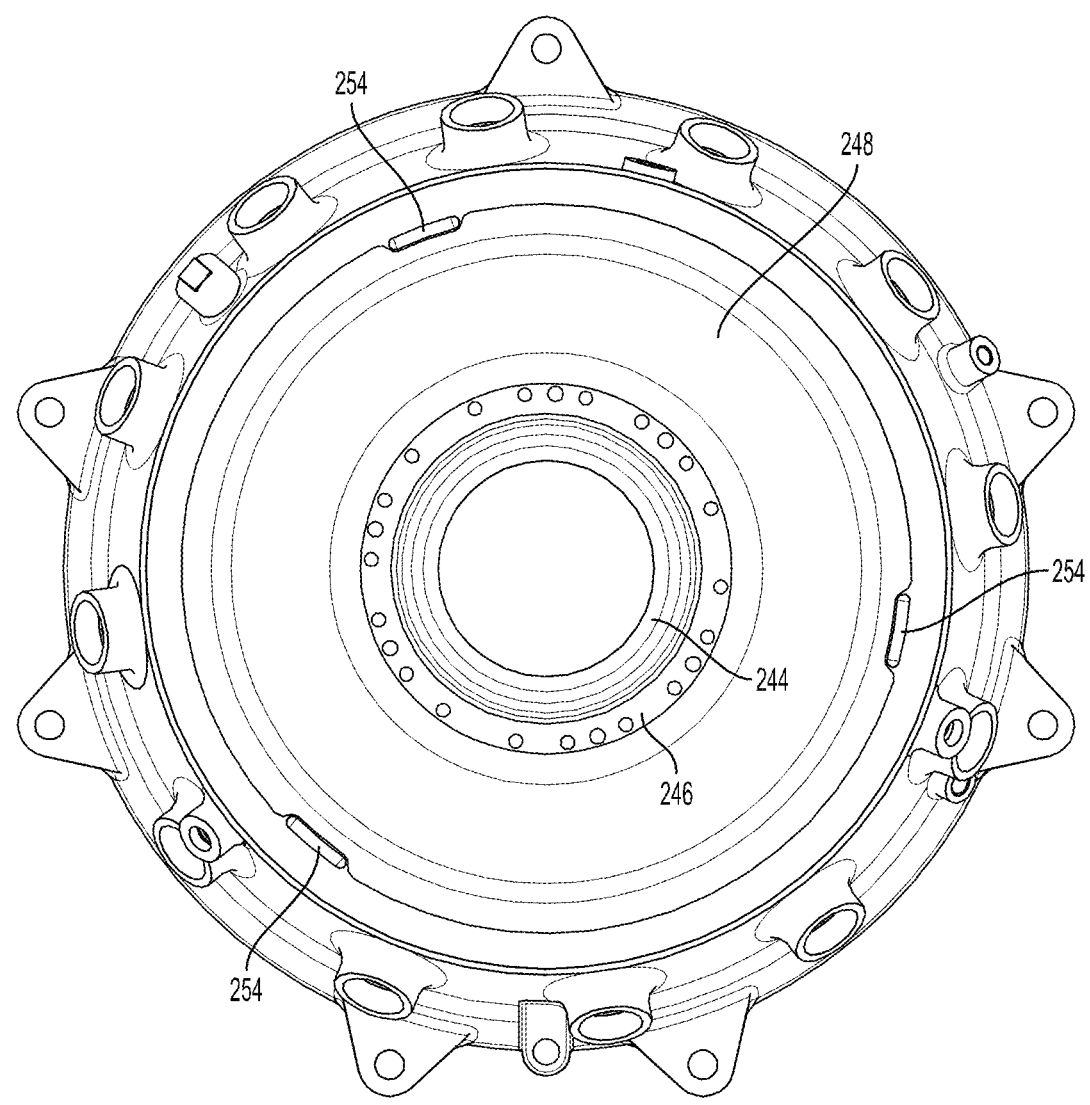
FIG. 5 illustrates an aft view of the exemplary superstructure of FIG. 2.
Figure 7:
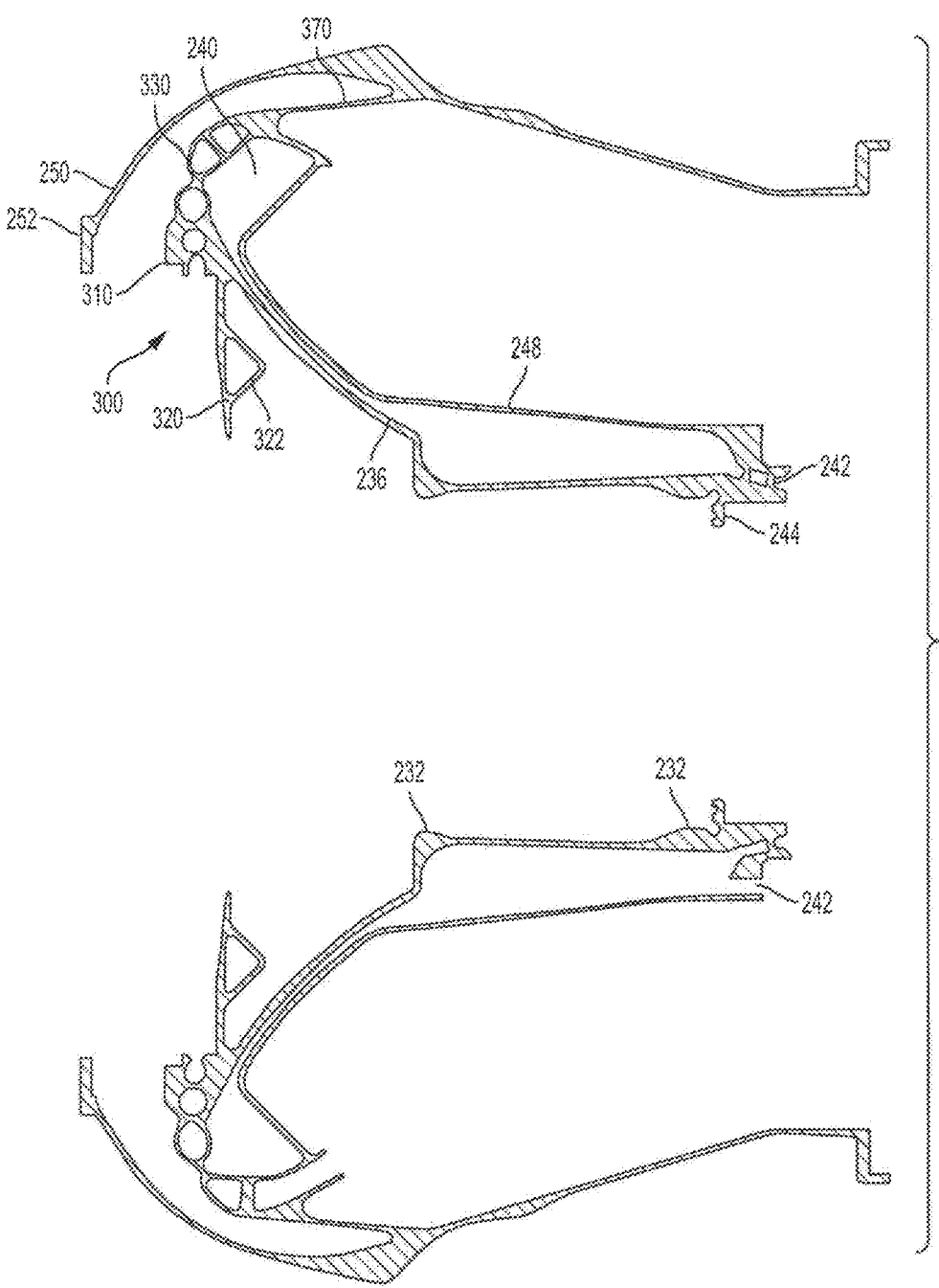
FIG. 7 illustrates another axial cross section of the exemplary superstructure of FIG. 2.

The monolithic superstructure 200 generally includes an outer case 210 that corresponds to a conventional combustor case and a diffuser case. As best seen in FIGS. 3 and 7, the outer case 210 may include a diffuser case portion 250 at a longitudinally proximal region and a combustor case portion 260 at a longitudinally distal region. The outer case 210 includes fuel nozzle ports 212 in the combustor case portion 260 for receiving fuel lines and mounting fuel nozzles. The outer case 210 also includes mounting tabs 214 located between the diffuser case portion 250 and the combustor case portion 260. The mounting tabs 214 are spaced about the outer case 210 and extend radially outward. The mounting tabs 214 are used to mount the monolithic superstructure 200 to a frame such as a vehicle frame or a generator frame. The diffuser case portion 250 includes a compressor flange 252 for mounting to a compressor case. The outer case 210 also includes igniter ports 216 for passing an ignition wire through the outer case 210. The outer case 210 also includes instrumentation ports 218 for passing instruments and or wires through the outer case 210. The outer case 210 also includes cooling air passages 254 for routing cooling air from a forward portion of the monolithic superstructure 200 to an aft component such as a turbine.

Figure 6:
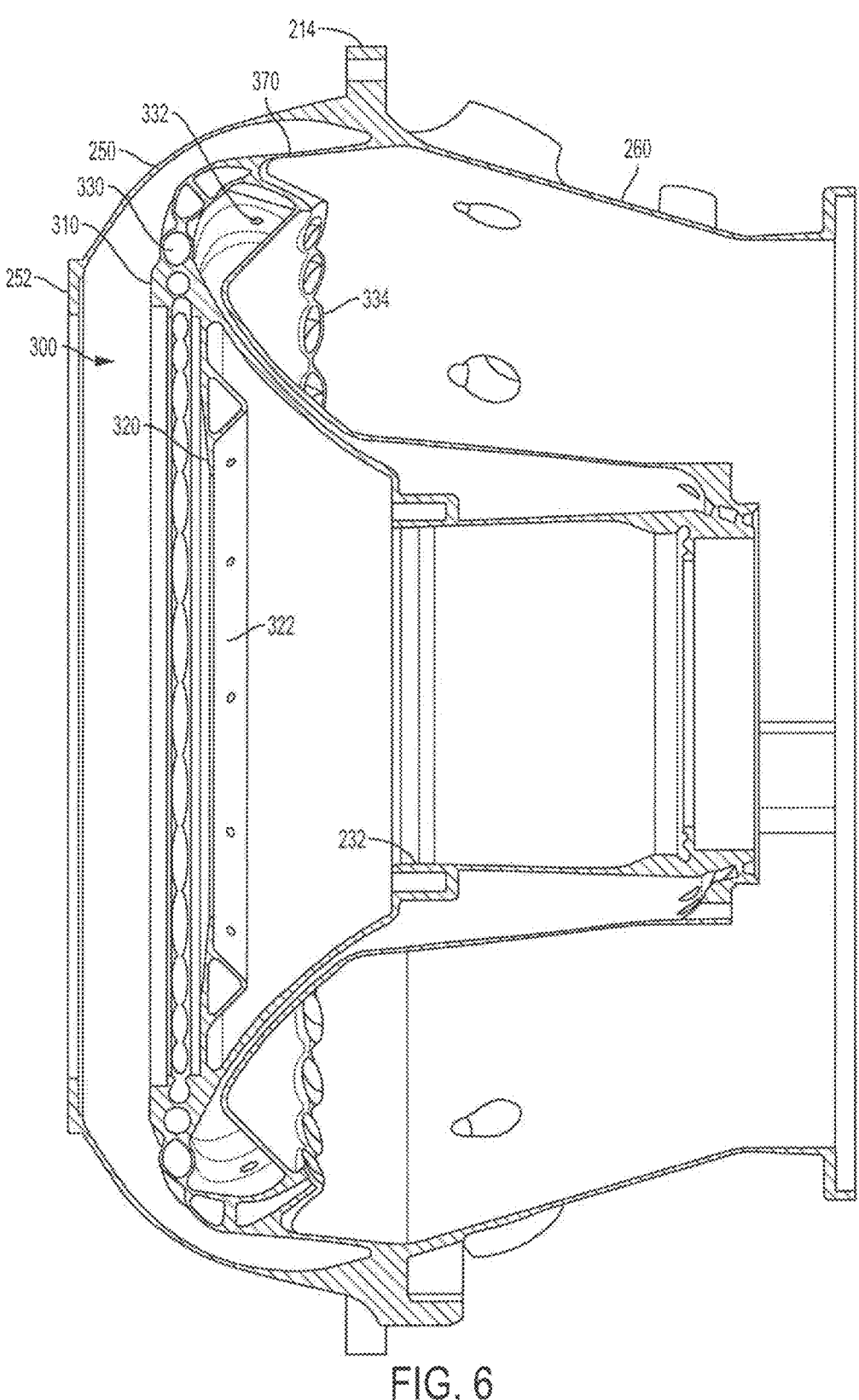
FIG. 6 illustrates an axial cross section of the exemplary superstructure of FIG. 2.

As best seen in FIGS. 6 and 7, the monolithic superstructure 200 also includes a centrally located bearing sump housing 230. The bearing sump housing 230 includes bearing supports 232 for mounting bearings that support a shaft 234 (shown in FIG. 4). The bearing sump housing 230 further includes a conical portion 236 that supports an aero component 300. The conical portion 236 is an annular transfer portion extending longitudinally proximally from the bearing supports 232 toward the aero component 300. The conical portion 236 transfers a load from the bearing supports 232 to the aero component 300. In an aspect, the conical portion 236 is shaped to maintain a position of the aero component 300 with respect to the bearing sump housing 230 and an impeller. The bearing sump housing 230 further includes a turbine cooling passage 240 defined between the conical portion 236, the aero component 300, and an inner combustor shroud 248. The turbine cooling passage 240 draws clean air from the aero component 300 and provides the clean air to turbine cooling blades (not shown) via an accelerator 242. The inner combustor shroud guides the clean air and also provides a heat shield for the bearing sump housing 230. The bearing sump housing further includes a bearing sump sealing surface 244. For example, the bearing sump sealing surface 244 may be an inwardly extending flange. The bearing sump sealing surface 244 may form a seal for the bearings. The bearing sump housing includes a turbine mounting surface 246 for connecting to a turbine.

The aero component 300 receives air from a compressor impeller 114 and provides compressed air to the combustor. For example, the aero component 300 performs functions traditionally performed by a diffuser and a deswirler. In an aspect, the compressor impeller 114 may be considered a rotor and the aero component 300 may be considered a stator. The aero component 300 divides an interior of the outer case 210 into a forward region and an aft region. As will be discussed in further detail below, the aero component 300 is also a load bearing component that transfers loads from the bearing sump housing 230 to the outer case 210 and the mounting tabs 214. The aero component 300 includes a diffuser portion 310, a back wall swirl plate 320, deswirler tubes 330, and an aero component support 370.

Figure 8:
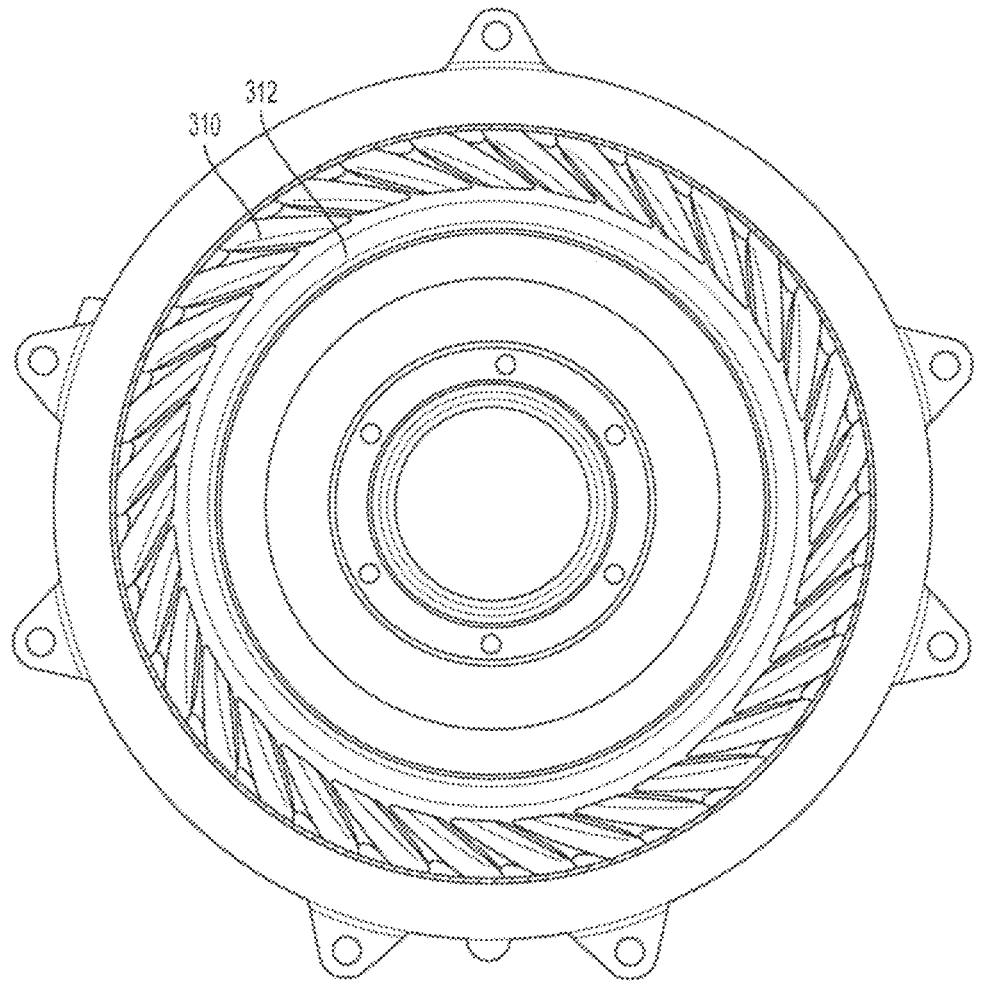
FIG. 8 illustrates a radial cross-section through a forward region of the exemplary superstructure.
Figure 9:
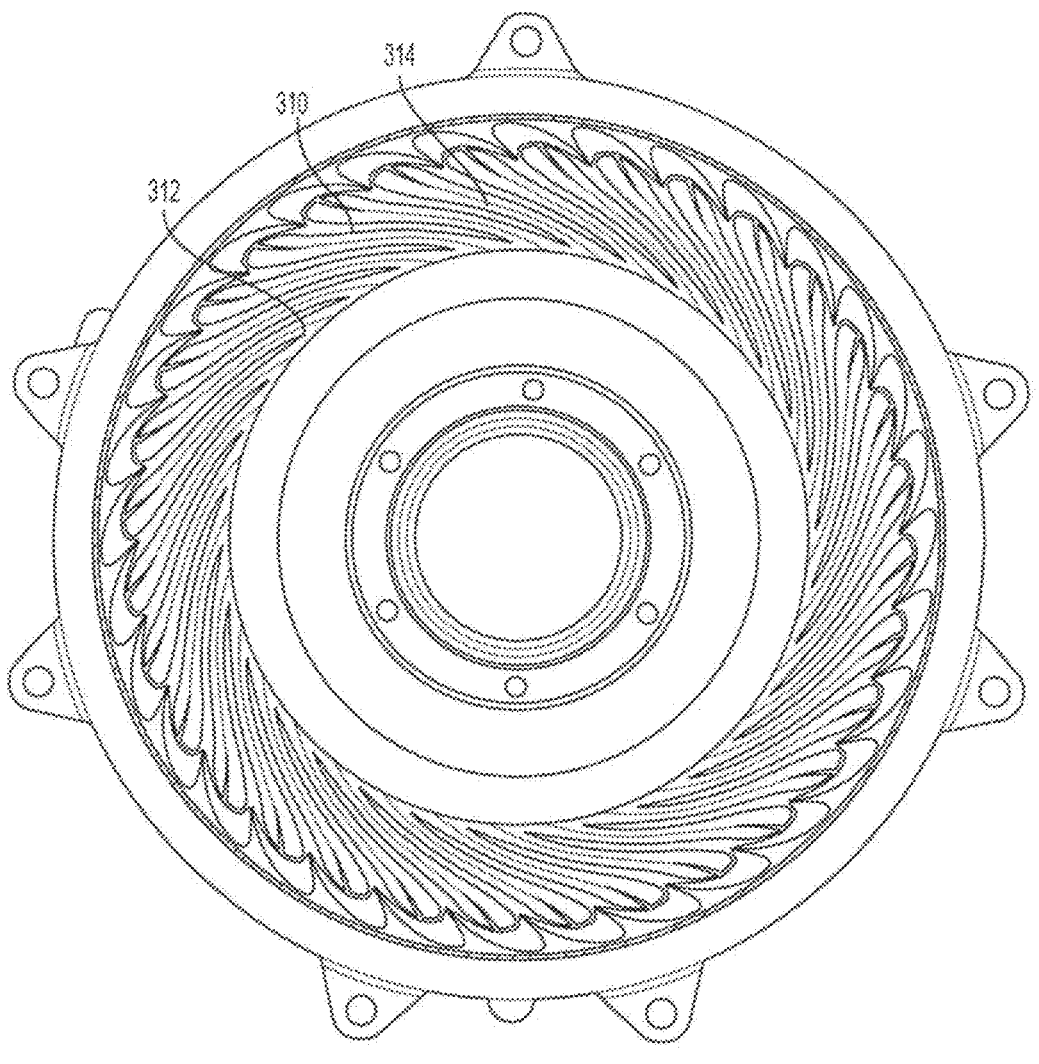
FIG. 9 illustrates another radial cross-section through an aero component of the exemplary superstructure.

FIG. 8 illustrates a lateral cross-section along the line 8-8 in FIG. 3. The diffuser portion 310 is an annular member extending radially inward to an edge 312. FIG. 9 illustrates a lateral cross-section along the line 9-9 in FIG. 3 through the diffuser portion 310. As best seen in FIG. 9, the diffuser portion 310 includes a plurality of internal passages 314 extending radially outward from the edge 312. The openings of the passages at the edge 312 are aligned with the final compressor impeller. The internal passages 314 expand in diameter as they extend from the edge 312 toward the deswirler tubes 330. As discussed in further detail below, the clearance between the diffuser portion 310 and the compressor impeller may be a performance critical spacing. For example, as the distance between the diffuser portion 310 and the impeller increases, pressurized air is less efficiently transferred to the aero component 300 via the internal passages 314.

The back wall swirl plate 320 is a plate located aft of the compressor impeller. The back wall swirl plate 320 deflects air exiting the compressor impeller to a radially outward direction. In an embodiment, the back wall swirl plate 320 further includes an impeller backwall stiffener 322. The impeller backwall stiffener 322 is an annular member with a triangular cross section that resists forces from the impeller. Further, the impeller backwall stiffener 322 provides frequency tuning to cancel resonant frequency noise generated by the engine.

The deswirler tubes 330 are a plurality of conjoined tubes that extend from the diffuser portion 310 to the inside of the combustor case portion 260. Each tube first extends radially outward from the diffuser portion 310. Each tube then curves both longitudinally and laterally. In an aspect, the lateral curvature is opposite a direction of the impeller movement. Accordingly, the deswirler tubes 330 reduce lateral swirling of the compressed air. The longitudinal curvature of the deswirler tubes 330 extends from the forward region to deswirler outlets 334 located within the combustor case portion 260 in the aft region. The deswirler tubes 330 may be the only path from the forward region to the aft region. In an aspect, the deswirler tubes 330 may include air extraction ports 332 for turbine cooling and sump pressurization. For example, the air extraction ports may connect an interior of the deswirler tubes 330 to the turbine cooling passage 240.

The aero component support 370 is an annular member that supports the aero component 300 with respect to the outer case 210. The aero component support 370 transfers bearing loads from the aero component 300 to the outer case 210 near the mounting tabs 214. The aero component support 370 extends longitudinally and radially from the deswirler tubes 330 to the outer case 210. In an aspect, the outer case 210 may be a relatively lower temperature than the aero component 300 and the bearing sump housing 230. For example, in operation, the aero component 300 may be hotter than the outer case 210 by 200 degrees Fahrenheit or more. The bearing sump housing 230 may be even hotter than the aero component 300. In the illustrated example of FIG. 7, the aero component support has a first end 371 disposed on the aero component 300 and a second end 372 disposed on the outer case 210.

Various properties of the aero component support 370 may be selected for a particular engine to optimize transfer of loads and thermal management. In particular, the shape of the aero component support 370 may be selected to maintain the position of the aero component 300 with respect to the impeller as the temperature of the engine increases. For example, the aero component support 370 may allow radial expansion of the aero component 300, while resisting longitudinal movement of the aero component 300. The radial expansion of the aero component 300 may correspond to radial expansion of the impeller, thereby maintaining a critical clearance between the impeller and the aero component. By resisting longitudinal movement of the aero component 300, the aero component support 370 maintains an alignment between the impeller and the diffuser portion 310.

Figure 10:
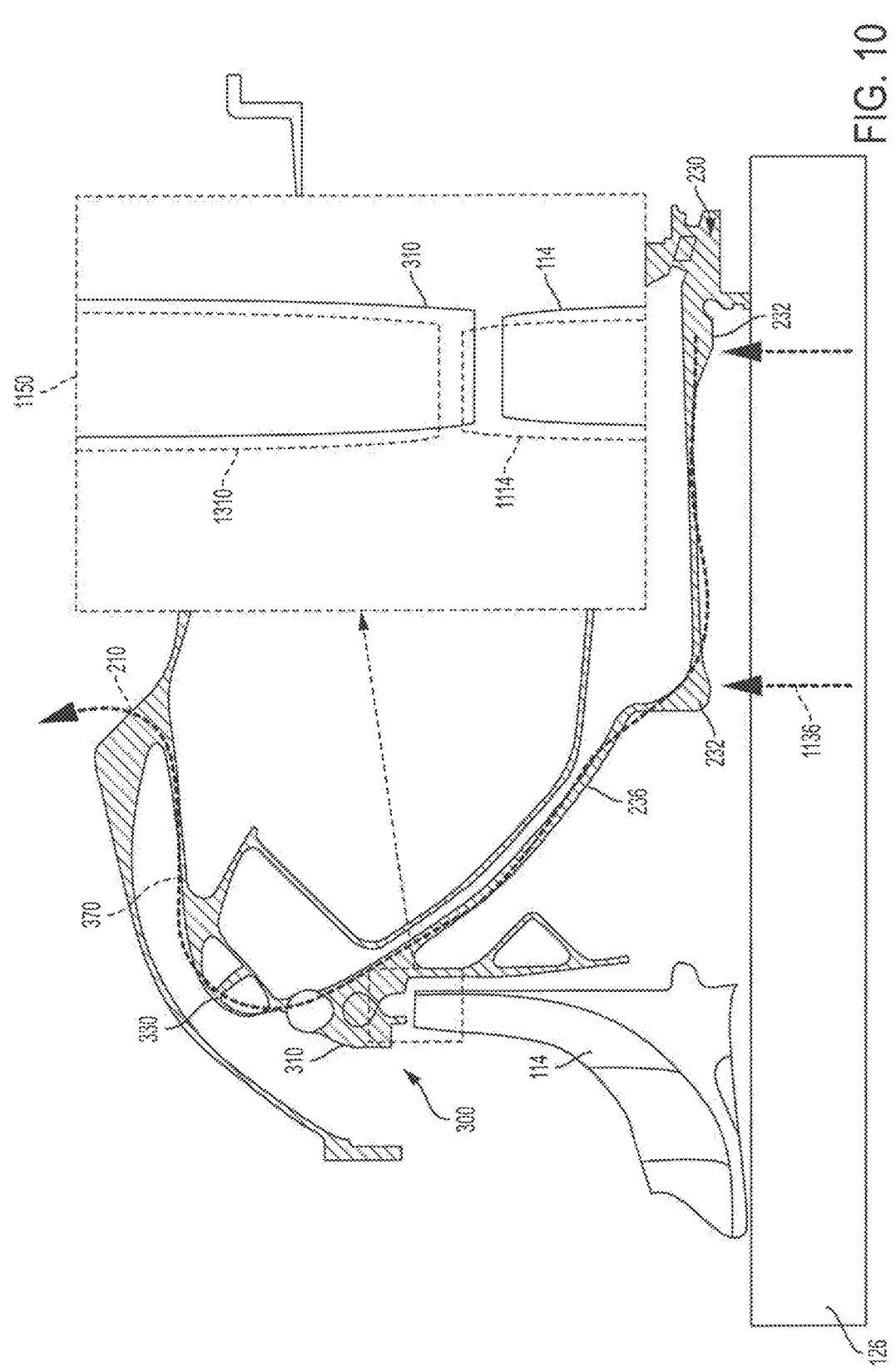
FIG. 10 is schematic diagram showing an example of a load path for the exemplary superstructure.

FIG. 10 is a schematic diagram illustrating a load path 1136 for an exemplary superstructure. The shaft 126 exerts load on the bearing supports 232. The bearing supports 232 transfer the load to the bearing sump housing 230. The conical portion 236 transfers the load to the aero component

300. In this example, the conical portion is connected to the aero component between the back wall swirl plate 320 and the deswirler tubes 330. The deswirler tubes 330 transfer the load to the annular aero component support 370. The annular aero component support 370 transfers the load to the outer case 210 including the mounting tabs 214.

Figure 1:
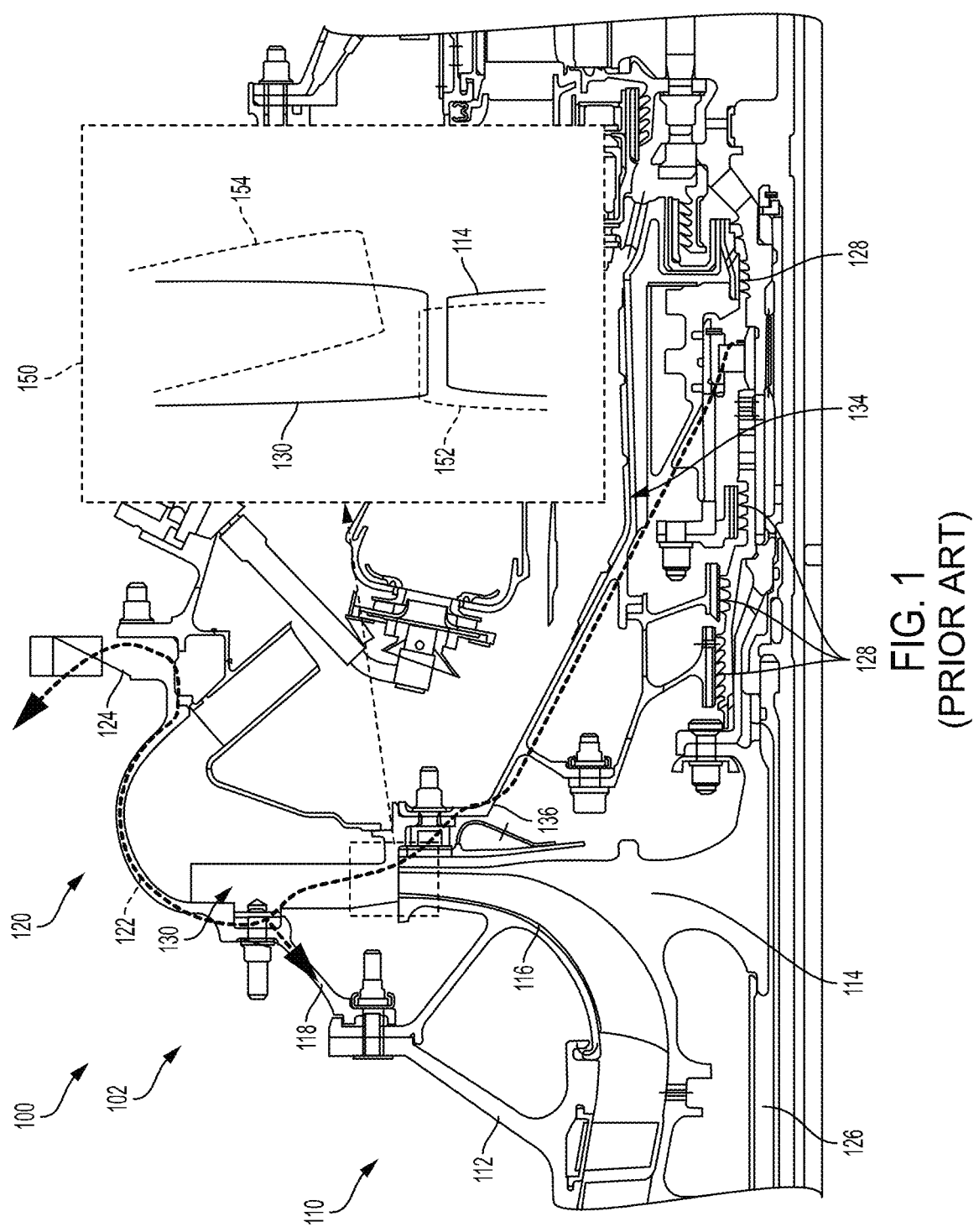
FIG. 1 is schematic diagram showing an example of a conventional gas turbine engine including an interface between a compressor and a combustor.

The diffuser portion 310 is positioned a critical dimension from the impeller 114. The diffuser portion 310 is supported by the conical portion 236 and by the annular aero component support 370 via the deswirler tubes 330. It should be noted, that the diffuser portion 310 is not directly connected to the diffuser case portion 250. Accordingly, the load path 1136 does not include an axial component through the diffuser portion 310, unlike the load path 136 in FIG. 1. The inset 1150 shows a magnified view of the interface between the impeller 114 and the diffuser portion 310. When the impeller 114 and the diffuser portion 310 are cold (e.g., at startup, as illustrated by solid lines), there is a small space between the impeller 114 and the diffuser portion 310. Moreover, the impeller 114 and the diffuser portion 310 are aligned such that compressed air exiting the impeller radially is transferred to the diffuser. As the system heats up (e.g., during operation, as illustrated by the dashed lines), the hot impeller 1114 may expand radially and shifts forward slightly. Due the support structure of the aero component 300 and the load path 1136, the hot diffuser 1310 also expands radially and shifts forward slightly. The forward shift may be kept below a threshold. Accordingly, the spacing between the hot impeller 1114 and the hot diffuser 1310 remains approximately the same as the spacing between the cold impeller 114 and the cold diffuser portion 310. In an aspect, the critical dimension between the impeller 114 and the diffuser portion 310 is maintained within 10% when the temperature of the system increases by at least 200 degrees Fahrenheit. Moreover, the hot diffuser 1310 maintains a radial alignment. For example, unlike the hot diffuser 154 the hot diffuser 1310 maintains the same orientation with respect to the impeller 114. Accordingly, the interface between the impeller 114 and the diffuser portion 310 maintains transfer efficiency as the system heats up.

The monolithic superstructure 200 may be manufactured using an additive manufacturing (AM) process. AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process, direct metal laser melting (DMLM), uses an energy beam, for example, an electron beam or electromagnetic radiation such as a laser beam, to sinter or melt a powder material, creating a solid three-dimensional object in which particles of the powder material are bonded together. AM may be particularly applicable for manufacturing, for example, the monolithic superstructure 200, which includes multiple concentric and coaxial subcomponents. In an aspect, the monolithic superstructure 200 may be fabricated in a layer-by-layer manner along the longitudinal axis. The AM process may fabricate the monolithic superstructure as an integrated structure. Various supports may be used to position portions of the monolithic superstructure during a build process. The supports and any unfused powder may be removed from the monolithic superstructure 200 upon completion. Further, additional components such as replaceable bearings, fuel lines, instrumentation, etc. may be mounted to the superstructure. In an aspect, one or more of the components described above may be replaced with a similar component mounted to a fixture integrated into the superstructure.

In an aspect, the monolithic and integrated design of the monolithic superstructure 200 integrates services and features as a single component. Design optimization may be performed for the integrated design rather than at a sub-component level. For example, lead paths, case and pressure vessel properties, aerodynamics and related performance, weight, and cost can be optimized as a holistic sub-system design. Additionally, the integrated design allows features (e.g., integrated deswirler tubes 330 and annular aero component support 370) that could not be practically assembled as separate components. The integrated structure also reduces assembly risks related to the functional and physical attributes of separate components. Accordingly, the integrated structure allows for manufacture of a sub-system in a predictable and repeatable manner.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A monolithic superstructure to support a rotor of a gas turbine engine, the monolithic superstructure comprising:
   a compressor flange to be coupled to an axial end of a compressor case of the gas turbine engine;
   a mounting tab to be coupled to a frame supporting the gas turbine engine;
   an outer case including a diffuser case portion extending between the compressor flange and the mounting tab;
   an aero component support; and
   an aero component connected to the outer case via the aero component support, the aero component including a diffuser portion, the diffuser portion longitudinally and radially aligned with the rotor when the diffuser portion is at a first temperature, the diffuser portion longitudinally and radially aligned with the rotor when the diffuser portion is at a second temperature, the second temperature at least 200 degrees Fahrenheit greater than the first temperature, wherein a first load path between the aero component and the mounting tab extends through the aero component support without extending through the diffuser case portion, and a second load path between the compressor flange and the mounting tab extends through the diffuser case portion without extending through the aero component support.

2. The monolithic superstructure of claim 1, wherein the aero component further includes deswirler tubes and a back wall swirl plate.

3. The monolithic superstructure of claim 2, wherein the deswirler tubes and the diffuser portion define a flow path between the rotor and a combustor of the gas turbine engine.

4. The monolithic superstructure of claim 2, wherein the aero component support extends between the deswirler tubes and the outer case.

5. The monolithic superstructure of claim 2, wherein the deswirler tubes include air extraction ports to connect the deswirler tubes to a turbine cooling passage.

6. The monolithic superstructure of claim 5, wherein the turbine cooling passage extends between the aero component and an accelerator.

7. The monolithic superstructure of claim 2, wherein the rotor is an impeller.

8. The monolithic superstructure of claim 7, wherein the deswirler tubes include a lateral curvature in an opposite direction of a direction of movement of the impeller.

9. The monolithic superstructure of claim 1, wherein the rotor and the diffuser portion are spaced a dimension at the first temperature, the dimension maintained within 10% when the diffuser portion is at the second temperature.

10. The monolithic superstructure of claim 1, wherein the aero component support is to allow radial movement of the aero component and to resist longitudinal movement of the aero component.

11. A monolithic superstructure comprising:
a bearing portion to be coupled to a shaft of a gas turbine engine;
an aero component including a diffuser portion radially aligned with a rotor coupled to the shaft;
a compressor flange to be coupled to an axial end of a compressor case of the gas turbine engine;
a mounting tab to be coupled to a frame supporting the gas turbine engine;
a diffuser case portion extending between the compressor flange and the mounting tab;
a first load transferring portion extending between the bearing portion and the aero component;
a second load transferring portion extending between the mounting tab and the aero component; and
wherein the bearing portion, the first load transferring portion, the aero component, the second load transferring portion, and the mounting tab sequentially define a first load path between the shaft and the frame, wherein the first load path extends through the second load transferring portion between the aero component and the mounting tab without extending through the diffuser case portion, and a second load path between the compressor flange and the mounting tab extends through the diffuser case portion without extending through the second load transferring portion.

12. The monolithic superstructure of claim 11, wherein the first load transferring portion is conical.

13. The monolithic superstructure of claim 11, wherein the bearing portion includes:
bearing supports adjacent to the first load transferring portion;
a sump sealing surface extending radially inward from the bearing supports; and
a turbine mounting surface to be coupled to a turbine case of the gas turbine engine.

14. The monolithic superstructure of claim 11, wherein the bearing portion further including a turbine cooling passage defined between the first load transferring portion, the aero component, and an inner combustor shroud.

15. The monolithic superstructure of claim 11, further including an outer case including:
the diffuser case portion; and
a combustor case portion, the mounting tab disposed between the diffuser case portion and the combustor case portion.

16. The monolithic superstructure of claim 15, wherein the aero component includes a plurality of deswirler tubes extending from the diffuser portion to a plurality of deswirler outlets within the combustor case portion.

17. The monolithic superstructure of claim 11, wherein the compressor flange is radially aligned with the diffuser portion.

18. The monolithic superstructure of claim 11, wherein a flow path through the monolithic superstructure extends through the aero component.

* * * * *